Aug. 4, 1970     J. D. DE LORENZO     3,523,292
RADAR TARGET-IDENTIFYING APPARATUS
Filed Oct. 18, 1967
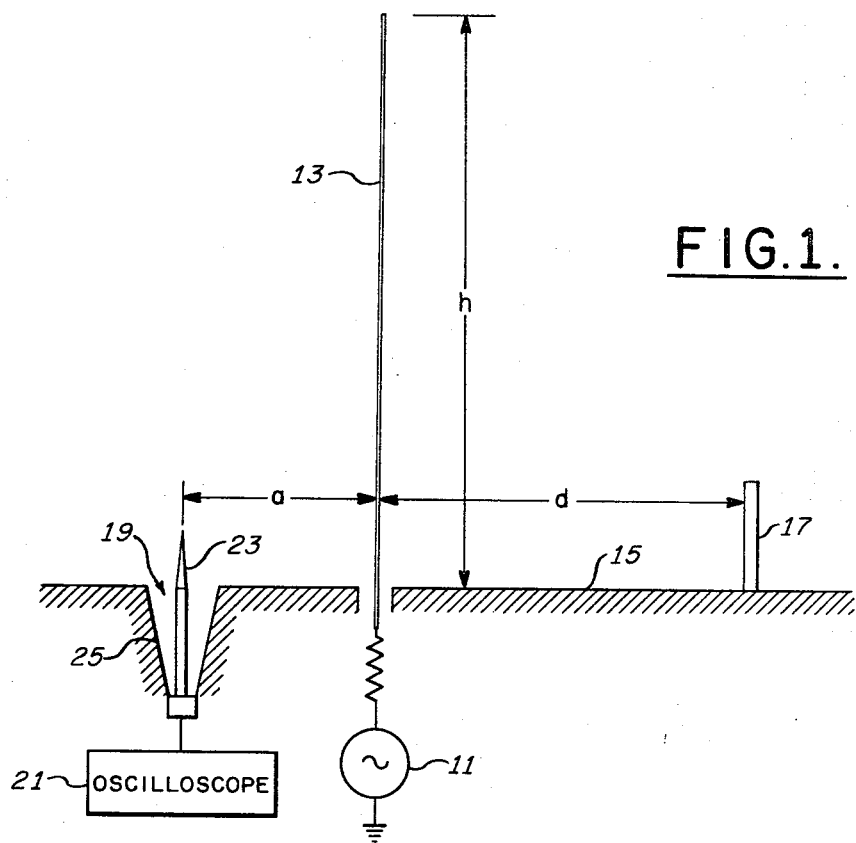
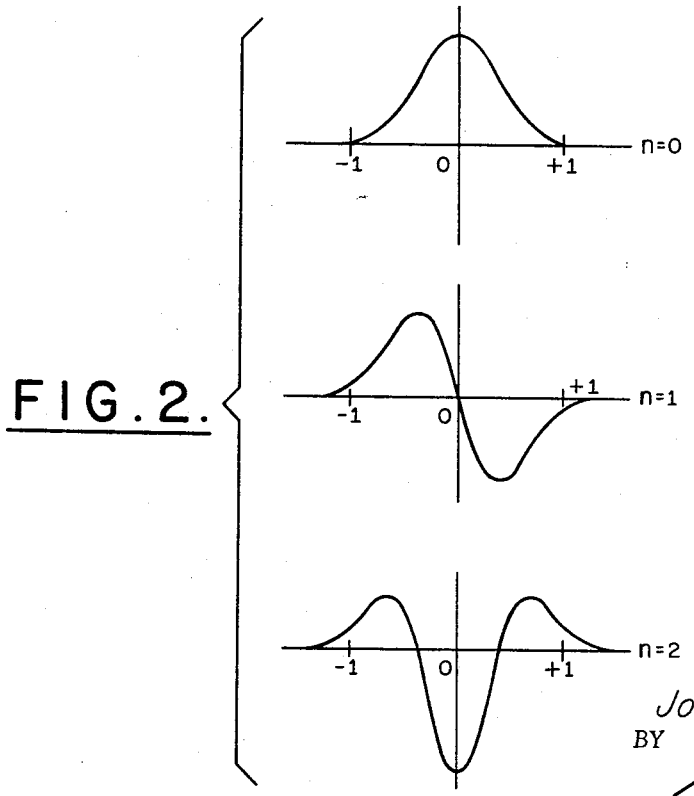
INVENTOR.
JOSEPH D. DE LORENZO
BY
S. C. Yeaton
ATTORNEY

United States Patent Office 3,523,292
Patented Aug. 4, 1970

3,523,292
RADAR TARGET-IDENTIFYING APPARATUS
Joseph D. DeLorenzo, Sudbury, Mass., assignor to Sperry Rand Corporation, a corporation of Delaware
Filed Oct. 18, 1967, Ser. No. 676,318
Int. Cl. G01s *9/02*
U.S. Cl. 343—5    8 Claims

ABSTRACT OF THE DISCLOSURE

Radar target-identifying apparatus having a pulse source of voltage driving a monopole antenna which is long with respect to the target distance and a receiving antenna which has a doublet response characteristic.

BACKGROUND OF THE INVENTION

This invention relates to radar systems and more specifically to radar systems capable of target-identification.

Measurement techniques have been devised wherein the steady-state amplitude and phase response of a field backscattered from a target can be measured over the entire band of frequencies. This provides a unique "signature" characteristic of the target. The procedure is necessarily laborious and difficult to implement.

Electromagnetic theory indicates that if a field backscattered from such a target in response to impulse illumination could be measured, then a unique signature could be obtained with a single measurement.

Theoretical studies, for instance, have investigated the scattering problem in the time domain. This perhaps is the most natural domain for analysis because, in general, if a signature has a broad spectral content, the signature is of very short duration in the time domain.

There have been several practical obstacles, however, which have limited the utility of such time domain measurements. These limitations include difficulties in generating, transmitting, receiving and displaying the necessary wideband signals.

In general, the systems available in the prior art do not disclose any means whereby the requisite impulse illumination can be achieved.

SUMMARY OF THE INVENTION

The present invention overcomes the obstacles of the prior art by providing a video pulse voltage source to drive a long monopole transmitting antenna capable of propagating the output signal from such source without distortion, and receiving the reflected field from the target on a receiving antenna which has a doublet response characteristic.

BRIEF DESCRIPTION OF THE DRAWINGS

FIG. 1 is a schematic diagram illustrating a configuration useful in practicing the invention; and FIG. 2 is a series of curves useful in explaining the invention.

DESCRIPTION OF THE PREFERRED EMBODIMENT

Referring now to FIG. 1, a pulse generator 11 is coupled through a coaxial cable to a long wire transmitting antenna 13 having a length $h$. The wire 13 extends through a ground plane 15 and is oriented perpendicularly with respect to this ground plane. A voltage from the generator 11 causes a pulse field to radiate from the base region of the long wire. The radiated pulse field illuminates a target 17 at a distance $d$. The electromagnetic energy is reflected from the target and propagates as a backscattered field toward the receiving antenna 19 located at a distance $a$ behind the vertical wire transmitting antenna. The receiving cross-section of the transmitting antenna is so small that virtually no aperture blockage occurs. The returned signal which has been "colored" by the scattering properties of the target is received by the matched antenna 19 and fed to a high frequency sampling oscilloscope 21 where it can be displayed with negligible distortion.

Commercially available pulse generators are capable of producing output pulse voltages in the form of either impulse voltages with extremely short durations or D.C. step voltages with extremely rapid rise times as desired.

It should be noted that, ideally, an impulse voltage has an infinitesimal time duration. For the purposes of the present invention, however, the time duration of such a pulse need be only short with respect to the propagation time between critical elements of the system. Consider, for instance, the apparatus of FIG. 1. An impulse field will be radiated from the base of the transmitting antenna directly to the receiving antenna. The voltage pulse produced by the generator 11 must be short enough so that the effect of this directly received impulse field on the antenna 19 will have completely vanished by the time that the desired impulse field reflected from the target 17 reaches the receiving antenna.

The model 1106A Pulse Generator manufactured by the Hewlett-Packard Company of Palo Alto, Calif., has been used as a pulse generator for the source 11. This generator produces impulse voltages having a duration in the order of 30 picoseconds.

Similarly, a D.C. step voltage pulse ideally would change from a quiescent level to a specified output level instantaneously. In practice, however, a step voltage may occur throughout a finite time interval so long as this interval is short with respect to the propagation time between critical elements of the system. Most commercial pulse generators such as the Hewlett-Packard generator mentioned previously, produce a step voltage and then differentiate this voltage to produce an impulse voltage. Therefore, in practice, one source may be used to produce either of these pulse voltages.

The transmitting antenna 13 consists essentially of a long thin wire suspended above the ground plane. It can be shown that radiation from the base of a long thin monopole is virtually frequency independent and also that when a transmitting antenna of this nature is excited by a discontinuous function such as an impulse or step function, a pulse field is radiated from the base of the antenna in the region where the wire emerges from the ground plane. A pulse field is also radiated from the tip of the antenna when the exciting pulse subsequently reaches that point.

The target 17, of course, may be any reflecting material of any configuration. For purposes of discussion, a flat plate has been assumed in order to simplify the discussion.

The receiving antenna 19 may be any antenna having sufficiently broadband characteristics so that its response corresponds to a doublet; that is, its response to a pulse is the differential of the received pulse.

The antenna described in copending patent application Ser. No. 664,205, filed Aug. 29, 1967, in the name of Gerald F. Ross, and assigned to the same assignee as the present application, may be used for this purpose. In general, this particular antenna is a coaxial device and includes a tapered center conductor 23 and a long, conical conducting sheath 25. The divergence of the conical sheath is sufficiently small so that propagation through this region is essentially pure TEM mode propagation.

The oscilloscope 21 may be any commercial oscilloscope capable of sampling pulses of the type under consideration. Experiments on devices embodying the invention were conducted with a commercially available sampling oscilloscope capable of responding to frequencies in the order of 12 gHz.

The desired pulse field is radiated from the base of the transmitting antenna, reflected from the target 17, and returned to the receiving antenna 19. Since the same pulse voltage requires a finite time to reach the tip of the transmitting antenna, if the transmitting antenna is made sufficiently long, the desired pulse will have been displayed before the signal corresponding to the radiation from the tip of the antenna reaches the receiving antenna 19. The oscilloscope can then be gated to display only the pulse corresponding to the pulse field radiated from the base of the antenna 13.

In an experimental scattering range employing the principles of the invention, the effect of interfering signals was further reduced by providing a ground plane having sufficient lateral extension so that the signals reflected from the edge of the ground plane reached the receiving antenna a considerable time after the desired signal had been displayed.

The concepts of impulse-like functions and their approximations can be understood by referring to Campbell and Foster "Fourier Integrals for Practical Applications," published by D. Van Nostrand, New York, 1948.

In this work, Campbell and Foster present a family of curves similar to those of FIG. 2. The curve for $n=0$ corresponds to an impulse function seen with finite time resolution. The $n=1$ curve corresponds to the doublet and the $n=2$ curve corresponds to the triplet. These singularity functions can be obtained by successive differentiation of a unit step function with finite rise time.

Early experiments with the scattering range of the invention were conducted using a pulse source 11 that provided individual short video pulses of approximately 100 picoseconds duration. Each pulse approximated a curve such as $n=0$ of FIG. 2. The response on the oscilloscope approximated curve $n=1$ of FIG. 2. Experiments further confirmed the fact that in general, the response of the receiving antenna under these conditions corresponds to a doublet. Effectively, then the system time-differentiates the received field.

Since the impulse-field response of the system corresponds to a doublet, it is clear from linear theory that if a step function were transmitted, the system response would be an impulse. Thus, a step function applied to the transmitting antenna 13 would provide a display in the oscilloscope 21 that resembled the curve $n=0$ of FIG. 2.

The use of a step function with a small but finite rise time as the transmitted waveform is equivalent to integrating the output of the receiver when an impulse-like wave is transmitted. Thus, in order to obtain a scattering range response which is impulsive and therefore distortionless, a simple step function may be used to drive a transmitting antenna. Because of the linearity of the system, the impulse response to a scattering target may be observed directly on the oscilloscope.

The description of the scattering range of FIG. 1 assumed that the target is a flat plate. Experiment with a variety of target shapes have confirmed the fact that each target shape modifies the return signal in a characteristic fashion. Thus each target shape provides a characteristic "signature" which thereafter may be used in identifying that target shape.

The scattering range may be used as a tool for designing radar systems since it provides a means for rapidly determining the response characteristics necessary for a radar to accommodate various targets.

The scattering range may also be used to catalogue the signatures of a wide variety of targets so that these signatures may be later used to identify unknown targets.

Because a single return pulse contains all the information characterizing a given target, the scattering range of the present invention obviates the need for laborious point-by-point measurements throughout a wide range of frequencies.

Because of the extremely short time interval during which the desired return pulse exists at the receiving antenna, spurious signals may be prevented from being displayed on the oscilloscope by a simple gating function. Simple dimensional relationships may be used to provide time separations between the desired and spurious pulses. This obviates the need for elaborate equipment such as anechoic chambers to absorb unwanted signals.

While the invention has been described in its preferred embodiment, it is to be understood that the words which have been used are words of description rather than limitation and that changes within the purview of the appended claims may be made without departing from the true scope and spirit of the invention in its broader aspects.

I claim:

1. A radar target-identifying apparatus comprising a source of voltage pulses; a ground plane; a monopole transmitting antenna driven by said source and disposed perpendicularly with respect to said ground plane; a target positioned on said ground plane to as to reflect pulse fields radiated from the base region of said transmitting antenna; a receiving antenna having a doublet response characteristic, said receiving antenna being positioned on said ground plane so as to receive pulse fields directly from the base region of said transmitting antenna and reflected pulse fields from said target; and display means for indicating the wave shape of signals received by said receiving antenna; said source providing pulses having a time duration shorter than the difference in arrival times as said receiving antenna of a given direct pulse field and the corresponding reflected pulse field; said transmitting antenna having a sufficient length so that a pulse field radiated from the tip of the transmitting antenna reaches the receiving antenna only after the receiving antenna response to the corresponding reflected pulse field has vanished.

2. The apparatus of claim 1 in which the pulses provided by said source have an impulse wave shape.

3. The apparatus of claim 1 in which the pulses provided by said source are D.C. step functions.

4. The apparatus of claim 1 in which the ground plane is sufficiently large so that any pulse field radiated from the edge of the ground plane reaches the receiving antenna only after the response of that antenna to the reflected wave has vanished.

5. The apparatus of claim 1 further characterized in that the transmitting antenna, the receiving antenna and the target are aligned in the same vertical plane.

6. The apparatus of claim 5 in which the transmitting antenna is positioned intermediate the target and receiving antenna.

7. The apparatus of claim 6 in which the distance between the transmitting antenna and the target is much greater than the distance between the transmitting antenna and the receiving antenna.

8. A radar target-identifying apparatus comprising a source of voltage pulses; a ground plane; a monopole transmitting antenna driven by said source and disposed perpendicularly with respect to said ground plane; a target positioned on said ground plane; a receiving antenna having a doublet response characteristic, said receiving antenna being positioned to receive backscattered fields from said target; and display means for indicating the wave shape of signals received by said receiving antenna; said transmitting antenna, said target, and said receiving antenna being mutually spaced apart so that the receiving antenna response to a pulse field received directly from the base of said transmitting antenna will have vanished before the corresponding backscattered field reaches the receiving antenna; said transmitting antenna having a sufficient length so that a pulse field radiated from the tip of the transmitting antenna reaches the receiving antenna only after the receiving antenna response to the corresponding backscattered field has vanished.

References Cited

UNITED STATES PATENTS 3,120,641   2/1964   Buckley _____ 325—67

RODNEY D. BENNETT, JR., Primary Examiner

M. F. HUBLER, Assistant Examiner

U.S. Cl. X.R.

325—67; 343—17.7